United States Patent [19]
Campbell

[11] 3,979,498
[45] Sept. 7, 1976

[54] RECOVERY OF CESIUM AND PALLADIUM FROM NUCLEAR REACTOR FUEL PROCESSING WASTE

[75] Inventor: David O. Campbell, Oak Ridge, Tenn.

[73] Assignee: The United States of America as represented by the United States Energy Research and Development Administration, Washington, D.C.

[22] Filed: Aug. 6, 1975

[21] Appl. No.: 602,503

[52] U.S. Cl. .................................. 423/2; 204/94; 252/301.1 W; 423/22; 423/463
[51] Int. Cl.² ................. C01B 9/02; C01D 17/00; C01G 55/00
[58] Field of Search ............ 252/301.1 R, 301.1 W; 423/2, 22, 463; 204/94

[56] References Cited
UNITED STATES PATENTS

| | | |
|---|---|---|
| 3,088,802 | 5/1963 | Clements et al. ................. 423/463 |
| 3,891,741 | 6/1975 | Carlin et al. ........................ 423/2 |
| 3,922,231 | 11/1975 | Carlin et al. ...................... 423/2 X |

OTHER PUBLICATIONS

Bailar et al., *Comprehensive Inorganic Chemistry*, 3, 1329, Pergamon Press (1973) Oxford.

Puche, *Chem. Abs.*, 33, abs. 3239[1] (1939).

*Primary Examiner*—Edward A. Miller
*Attorney, Agent, or Firm*—Dean E. Carlson; David S. Zachry; Allen H. Uzzell

[57] ABSTRACT

A method of recovering cesium and palladium values from nuclear reactor fission product waste solution involves contacting the solution with a source of chloride ions and oxidizing palladium ions present in the solution to precipitate cesium and palladium as $Cs_2PdCl_6$.

3 Claims, No Drawings

RECOVERY OF CESIUM AND PALLADIUM FROM NUCLEAR REACTOR FUEL PROCESSING WASTE

BACKGROUND OF THE INVENTION

This invention was made in the course of or under a contract with the Energy Research and Development Administration. It relates to the art of nuclear fuel reprocessing and more particularly to the art of recovering cesium and palladium values from fission product waste solution.

In nuclear fuel reprocessing systems, spent fuel elements are periodically removed from the reactor and the fission products are separated from the fissionable uranium, plutonium and neptunium. Typically, the component containing the fission products leaves the first extractor as a nitric acid solution containing a variety of metal ions. As used herein the term "fission product waste solution" refers to a solution of the various metal ions which remain in solution after spent, irradiated nuclear fuel is dissolved in acid and the fissionable materials selectively extracted from the solution. This fission product waste solution contains several useful radioisotopes, such as $^{137}Cs$ and $^{90}Sr$. In addition, several precious metals such as palladium, ruthenium and rhodium are present in recoverable quantities. It is therefore profitable that these elements be removed prior to long-term storage of the waste material. Furthermore, because of the long half-lives of $^{137}Cs$ and $^{90}Sr$ it is desirable that they be removed as much as possible from the waste materials prior to storage.

In most fuel reprocessing plants, for example the Midwest Fuel Recovery Plant in Morris, Illinois, fuel rods are removed from their assemblies, sheared to the desired length, and fed to a continuous leacher for dissolution with nitric acid. This leacher solution is separated from the metal hulls, etc. and is transferred to an extraction column where it is contacted with a solvent (typically tributyl phosphate in an organic diluent) which selectively extracts the U, Pu, and (if desired) Np values from the solution. The extractant solution is then treated according to one of several well-known processes to further separate and recover the fissionable material. Typical examples are the Purex process, the "25" process, and the Butex process, all more fully described in *Chemical Processing of Reactor Fuels*, Academic Press, New York and London (1961) which is herein incorporated by reference.

The aqueous nitric acid solution (raffinate) remaining in the extraction column contains the fission products. The fission product solution is typically withdrawn from the extractor and subjected to further treatment in preparation for long-term storage. Fission product waste solution has a very complex composition, consisting of various metal ions in several oxidation states as well as a variety of soluble complex ions.

The basis of this invention lies in the discovery that two valuable fission products may be recovered from fission product waste solution via the formation of a stable compound, $Cs_2PdCl_6$, which precipitates when the solution is oxidized to convert Pd ions to the IV oxidation state and contacted with a soluble chloride or other source of chloride ions.

PRIOR ART

In the prior art, there exists several methods for treating fission product waste solution to recover valuable materials and to reduce the radioactive lifetime of that waste which is ultimately to be stored underground. It is particularly desirable that $^{137}Cs$ be removed from fission product waste because of its long half-life.

One prior art method for recovering $^{137}Cs$ values is described in U.S. Pat. No. 3,179,503 issued to Horner, et al. Apr. 20, 1965. This procedure involved extracting the Cs values from a basic solution with ortho- and para-substituted phenols. While this method provides a high degree of Cs recovery, it is wasteful with respect to nitric acid. In all proposed fuel reprocessing systems, the initial fuel dissolution is carried out in nitric acid, and the waste fission products leave the initial extractor in nitric acid solution. Since the Horner, et al. process requires a basic solution, large amounts of basic materials must be added to the waste for Ph adjustment. Thus, nitric acid, being neutralized, may not be recycled and must be continually supplied to the reprocessing facility.

SUMMARY OF THE INVENTION

It is an object of the present invention to provide a method for recovering cesium values from nuclear reactor fission product waste which requires no pH adjustment and thereby permits nitric acid recycle.

It is a further object of the present invention to provide a method for simultaneously recovering Cs and Pd values in a single step precipitation process which requires a minimum of added reagents to the waste material.

These and other objects are accomplished by providing a method for recovering Cs and Pd values from fission product waste solution comprising oxidizing Pd ions present in said solution to $Pd^{115\ 4}$, contacting said solution with a source of chloride ions to precipitate said Cs and Pd values as $Cs_2PdCl_6$, and recovering the precipitate.

DETAILED DESCRIPTION

It has been discovered according to the present invention that under oxidizing conditions Cs and Pd may be recovered from nitric acid fission product solution as an insoluble precipitate by contacting with a chloride source. This source may be a soluble chloride or other compound which yields chloride ions in solution. This precipitate has been identified as predominantly $Cs_2PdCl_6$. The present invention is therefore a separation process dependent upon the formation of $Cs_2PdCl_6$ in the fission product dependent upon the formation of $Cs_2PdCl_6$ in the fission product solution.

The success of any precipitation process depends upon the formation of a stable compound of limited solubility from a solution of dissolved ionic species. The solubility of a precipitate can be calculated in a straightforward way from the solubility product at a given ionic strength, provided that its ions undergo no secondary reactions or associations with other ions present in the solution. In aqueous media containing only a few (3 or 4) ionic species, it is often possible to predict from solubility tables which combination of ions will result in the formation of a stable insoluble compound. However, in a solution as complex as fission product waste solution containing many different metal ions of various oxidation states as well as several complex ionic species, it is an impossible task to predict which if any combinations of ions will result in the precipitation of a stable compound under a given set of reaction conditions. For example, in fission product waste solution, there are several possible combinations of ionic species which theoretically would result in the formation of compounds present in excess of their solubilities. For example, it is known that molybdate ions are normally present in fission product waste solution, however, the precipitation of the insoluble rare earth and barium molybdates is not observed. Likewise, precipitation of insoluble tellurates and antimony coordination compounds is possible, but is not observed.

In order to demonstrate the operability of the subject method and its dependence upon the oxidation of palladium ions as well as chloride addition, the following experimental results are presented. A simulated waste solution representing the fission product concentrations for the dissolution of fuel containing 1 metric ton of uranium in 3100 liters 2N $HNO_3$ is provided. The composition of the solution is presented in the following table.

TABLE

| Element | Concentration (Millimoles/Liter) |
| --- | --- |
| Rb | 1.25 |
| Cs | 5.87 |
| Sr | 3.00 |
| Ba | 3.90 |
| Y | 1.69 |
| La | 2.95 |
| Ce | 5.68 |
| Pr | 2.74 |
| Nd | 9.16 |
| Sm | 1.90 |
| Eu | 0.36 |
| Gd | 0.24 |
| Tb | 0.0036 |
| Dy | 0.0022 |
| Zr | 12.9 |
| Mo | 11.4 |
| Ag | 0.18 |
| Cd | 0.24 |
| In | 0.0035 |
| Ge | 0.0011 |
| Sr | 0.13 |
| As | 0.0004 |
| Sb | 0.032 |
| Se | 0.021 |
| Te | 1.42 |
| Br | 0.06 |
| I | 0.67 |
| Ru | 6.81 |
| Rh | 1.22 |
| Pd | 4.29 |

I

To several 3 ml. of samples of simulated waste solution was added sufficient NaClO solution to give hypochlorite concentrations over the range of 0.02 to 0.2M. In each case the color of the solution changed from dark reddish-brown, (largely from Ru) to a bright orange. After several minutes, depending upon the hypochlorite concentration, an orange-red precipitate appeared. The precipitate was recovered by centrifugation, washed with water, dried in air, and analyzed by x-ray flourescence and x-ray diffraction. The flouresence results showed the prescence of Cs and Pd in the ratio approximately 2 to 1, and also a small amount of Rb. The diffraction pattern was that reported for $Rb_2PdCl_6$ and $Cs_2PdCl_6$, with a lattice constant intermediate between the two but closer to that for the Cs compound.

II

An excess of cerium ions (with respect to Pd) were added to 5 ml. simulated waste solution (as aqueous 0.1M $Ce(NH_4)_2(NO_3)_6$). The color of the solution changed to orange-red (presumably representing the oxidation of Ru to $RuO_4$ and of $Pd^{+2}$ to $Pd^{+4}$ ions) but no precipitate was formed. Subsequent addition of excess KCl to a concentration of 0.05M resulted in the formation of an orange-red precipitate which was analyzed to be similar to the precipitate of I.

III

Simulated waste solution (70 ml.) was electrolytically oxidized by maintaining a potential of 1.7 volts across the solution using Pt electrodes for 4 hours. After this period, the $Pd^{+2}$ present had been oxidized to $Pd^{115\ 4}$. The addition of 3.5 ml. of 1 N HCl (to a final concentration of 0.05 M in the waste) resulted in the formation of the orange-red precipitate which was analyzed to be of similar composition as the precipitate in I and II.

The reactions and mechanisms of reaction which are observed to occur in fission product waste solution are not yet fully understood, and the formation and behavior of ionic species is largely unpredictable. In view of the many possible reactions forming insoluble compounds, especially under oxidizing conditions, the formation of the stable $Cs_2PdCl_6$ was most surprising and unexpected particularly since the I and Br ions present in the solution are converted to the elemental form under the oxidizing conditions of the process.

As a preferred embodiment to minimize handling and the addition of material to the waste, the waste solution which leaves the first extraction column in the fuel processing facility is held for several days to allow very highly active short-lived wastes to decay. The solution is then electrolytically oxidized by passing sufficient current through the solution to oxidize the $Pd^{+2}$ present to $Pd^{+4}$. Sufficient HCl is added at this time to precipitate Cs fission product as $Cs_2PdCl_6$. This compound contains the valuable $^{137}Cs$ isotope as well as $^{133}Cs$, $^{134}Cs$, and $^{135}Cs$. Because chloride is associated with other ionic species in the solution, an excess of about 50 per cent HCl with respect to $PdCl_6^{-2}$ ion formation is sufficient. Because $CsPdCl_6$ is slightly soluble, the precipitate recovery can be improved by adding additional (or recycle) Pd to the solution, lowering the temperature, or other well-known methods of depressing the solubility of a slightly soluble precipitate. The precipitate, which now contains most of the Cs and Pd typically present, is separated centrifugally, dried, and ready for use as a gamma source. Alternately, the Pd may be separated from the Cs by reducing the $Pd^{+4}$ with conventional reducing agents and precipitation with hydroxide.

Because Pd is normally present in fission product waste in stoichiometric excess (with respect to $Cs_2PdCl_6$ formation), Pd recovery may be increased by adding additional stable Cs and (if needed) Cl ions to the waste solution remaining after recovery of the initial precipitate. This will cause the precipitation of additional $Cs_2PdCl_6$ which will contain some of the $^{137}Cs$ which had previously remained in solution due to the slight solubility of the initial precipitate. Thus, by contacting the fission product waste solution with a source of stable Cs ions, additional $Cs_2PdCl_6$ will precipitate and may be recovered, thereby increasing both the Pd recovery and the $^{137}$Cs removal efficiency.

What is claimed is:

1. A method of recovering fission product Cs and Pd values from nitric acid fission product waste solution containing said Cs and Pd values and other fission product metal values, said solution resulting from reprocessing irradiated nuclear fuel, said method comprising oxidizing Pd ions present in said solution to Pd$^{+4}$, contacting said solution with a source of chloride ions capable of causing the precipitation of said Cs and Pd values as $Cs_2PdCl_6$, and recovering the resulting precipitate.

2. The method of claim 1 wherein said oxidizing step is carried out electrolytically.

3. The method of claim 1 further comprising, after recovering said precipitate, contacting the fission product waste solution with a source of non-radioactive Cs ions to cause the precipitation of additional $Cs_2PdCl_6$, and recovering said additional $Cs_2PdCl_6$.

* * * * *